United States Patent
Honjyou et al.

(10) Patent No.: US 6,834,148 B2
(45) Date of Patent: Dec. 21, 2004

(54) OPTICAL FIBER CORD AND MANUFACTURING METHOD THEREOF

(75) Inventors: Takeshi Honjyou, Sakura (JP); Masahiro Kusakari, Sakura (JP); Ken Ohsato, Sakura (JP); Kazunaga Kobayashi, Sakura (JP); Keiji Ohashi, Sakura (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 10/406,291

(22) Filed: Apr. 4, 2003

(65) Prior Publication Data
US 2003/0190125 A1 Oct. 9, 2003

(30) Foreign Application Priority Data

| Apr. 5, 2002 | (JP) | 2002-104463 |
| Jun. 4, 2002 | (JP) | 2002-162574 |
| Jun. 4, 2002 | (JP) | 2002-162575 |
| Oct. 1, 2002 | (JP) | 2002-289194 |
| Oct. 1, 2002 | (JP) | 2002-289195 |

(51) Int. Cl.$^7$ .................................................. G02B 6/44
(52) U.S. Cl. ........................................................ 385/114
(58) Field of Search ............................ 385/112–114, 109

(56) References Cited

U.S. PATENT DOCUMENTS 5,566,266 A * 10/1996 Nave et al. ................... 285/95
5,802,231 A * 9/1998 Nagano et al. .............. 385/114

* cited by examiner

Primary Examiner—Javaid H. Nasri
(74) Attorney, Agent, or Firm—Oblon, Spivak, McClelland, Maier & Neustadt, P.C.

(57) ABSTRACT

An optical fiber ribbon cord 10 comprising a plurality of tension fibers 13 juxtaposed along about an optical fiber ribbon 11 and a sheath 14 composed of a resin covering all the exteriors thereof, wherein at least one tape body 15 with higher Young's modulus than that of the sheath is inserted within the interior A of a side wall in the minor axis of the sheath.

4 Claims, 17 Drawing Sheets

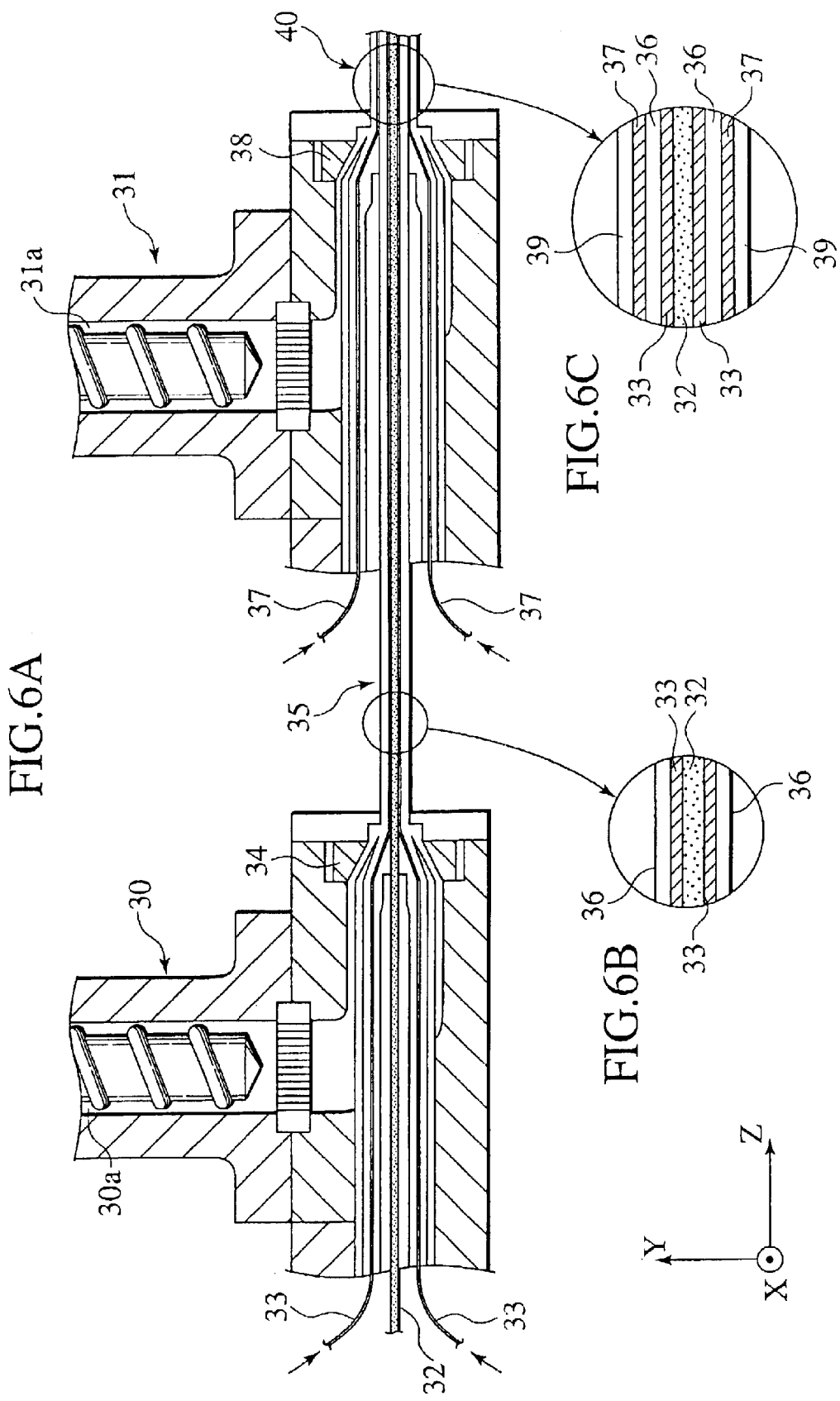

FIG.8

| | INCREASE IN ATTENUATION AT THE END OR THE CENTER OF THE FIBER WHEN 250N IS APPLIED (dB) | | INCREASE IN ATTENUATION AT THE END OR THE CENTER OF THE FIBER WHEN 500N IS APPLIED (dB) | |
|---|---|---|---|---|
| | RIBBON FIBER END | RIBBON FIBER CENTER | RIBBON FIBER END | RIBBON FIBER CENTER |
| RIBBON CORD ACCORDING TO THE PRESENT INVENTION | 0.0 | 0.0 | 0.0 | 0.0 |
| CONVENTIONAL RIBBON CORD | 0.0 | 0.0 | 0.2 | 0.0 |

FIG.10

| | WIDTH OF INSERTED TAPE [mm] | INCREASE IN ATTENUATION AT THE END OR THE CENTER OF THE FIBER WHEN 250N IS APPLIED [dB] | | INCREASE IN ATTENUATION AT THE END OR THE CENTER OF THE FIBER WHEN 500N IS APPLIED [dB] | |
|---|---|---|---|---|---|
| | | RIBBON FIBER END | RIBBON FIBER CENTER | RIBBON FIBER END | RIBBON FIBER CENTER |
| OPTICAL FIBER RIBBON ACCORDING TO THE PRESENT INVENTION | 1.0 | 0.0 | 0.0 | 0.05 | 0.0 |
| | 2.0 | 0.0 | 0.0 | 0.0 | 0.0 |
| CONVENTIONAL OPTICAL FIBER RIBBON | — | 0.0 | 0.0 | 0.2 | 0.0 |

|  | INCREASE IN ATTENUATION AT THE END OR THE CENTER OF THE FIBER WHEN 250N IS APPLIED (dB) | | INCREASE IN ATTENUATION AT THE END OR THE CENTER OF THE FIBER WHEN 500N IS APPLIED (dB) | |
|---|---|---|---|---|
|  | RIBBON FIBER END | RIBBON FIBER CENTER | RIBBON FIBER END | RIBBON FIBER CENTER |
| RIBBON CORD ACCORDING TO THE PRESENT INVENTION | 0.0 | 0.0 | 0.0 | 0.0 |
| CONVENTIONAL RIBBON CORD | 0.0 | 0.0 | 0.2 | 0.0 |

FIG.19

RELATION BETWEEN LONGITUDINAL FORCE AND INCREASE IN ATTENUATION (MEASURED AT THE WAVE LENGTH OF 1.55 μM)

|  | INCREASE IN ATTENUATION AT THE END OR THE CENTER OF THE FIBER WHEN 250N IS APPLIED (dB) | | INCREASE IN ATTENUATION AT THE END OR THE CENTER OF THE FIBER WHEN 500N IS APPLIED (dB) | |
|---|---|---|---|---|
|  | RIBBON FIBER END | RIBBON FIBER CENTER | RIBBON FIBER END | RIBBON FIBER CENTER |
| RIBBON CORD ACCORDING TO THE PRESENT INVENTION | 0.0 | 0.0 | 0.0 | 0.0 |
| CONVENTIONAL RIBBON CORD | 0.0 | 0.0 | 0.2 | 0.0 |

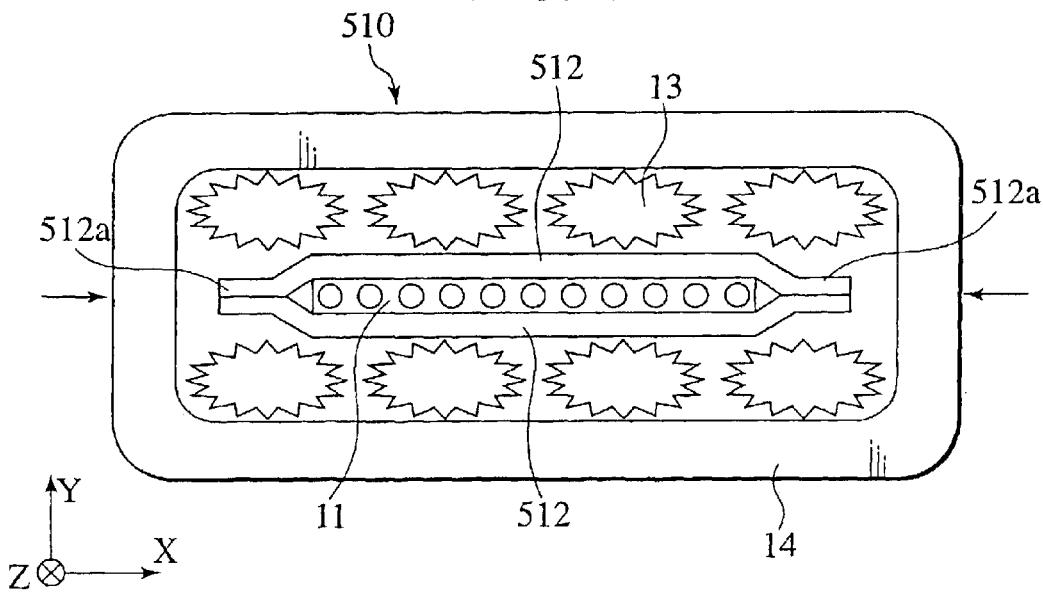

|  | INCREASE IN ATTENUATION AT THE END OR THE CENTER OF THE FIBER WHEN 250N IS APPLIED (dB) | | INCREASE IN ATTENUATION AT THE END OR THE CENTER OF THE FIBER WHEN 500N IS APPLIED (dB) | |
|---|---|---|---|---|
|  | RIBBON FIBER END | RIBBON FIBER CENTER | RIBBON FIBER END | RIBBON FIBER CENTER |
| RIBBON CORD ACCORDING TO THE PRESENT INVENTION | 0.0 | 0.0 | 0.0 | 0.0 |
| CONVENTIONAL RIBBON CORD | 0.0 | 0.0 | 0.2 | 0.0 |

OPTICAL FIBER CORD AND MANUFACTURING METHOD THEREOF

BACKGROUND OF THE INVENTION

1. Field of the Invention

The present invention relates to a method of manufacturing an optical fiber cord comprising a plurality of tension fibers juxtaposed longitudinally along about an optical fiber ribbon and a sheath composed of a resin covering all the exteriors thereof.

2. Description of the Related Art

Known in the art is an optical fiber ribbon cord comprising a plurality of optical fibers bound in the shape of a tape and all the exteriors thereof are covered with a sheath in the shape of a rectangle or an oval, because of easy joining with a connector and the advantage of equalizing every transmission line length of optical fibers. FIG. 1A and FIG. 1B are the cross-sectional views of the conventional optical fiber ribbon cord at rest just as manufactured and of the optical fiber ribbon cord in operation, respectively. In FIG. 1A, the optical fiber ribbon cord 1 comprises a fiber ribbon 2 disposed in the center with multi-fibers (12 fibers), tension fibers 3 juxtaposed longitudinally (Z-direction) along about the fiber ribbon 2 in order to supply tensile strength, and a sheath 4 covering them.

The tension fibers 3 carry out the functions of a cushion for preventing external force from direct application via the sheath 4 onto the fiber ribbon 2, since the tension fibers 3 are located between the fiber ribbon 2 and the sheath 4.

SUMMARY OF THE INVENTION

However, in the conventional optical fiber ribbon cord 1, it is difficult to keep the tension fibers 3 staying stably in the direction of the major axis (X-direction) of the fiber ribbon 2 during operation, since the tension fibers are liable to move upward or downward in the direction of the minor axis (Y-direction) of the cord from the fiber ribbon 2 as a borderline, as shown in FIG. 1B.

Thus, when external force is applied from the direction of the major axis, the fiber ribbon 2 directly contacts the sheath 4 to generate large bending of fibers a, b, which are located at both ends of a plurality of fibers in the fiber ribbon 2, resulting in increase in attenuation or occasional interruption of signal transmission with breaking of the fibers.

In order to overcome such a situation, it was considered that the distance from the edge of the fiber ribbon to the fiber at the end would be longer, but there has still remained such a problem for practical use that enlargement of the tape width results in being mismatched with the size of a fiber ribbon insertion portion of a connector.

The present invention has been made in consideration of such circumstances, and according to the present invention provided are an optical fiber ribbon cord and a method of manufacturing the same, wherein enhancement of the transmission characteristics, especially, prevention of increase in attenuation at low temperature has been attempted by preventing external force from being applied directly to an optical fiber ribbon keeping the fiber ribbon from bending even when the external force is applied to a sheath.

According to a first technical aspect of the present invention, an optical fiber ribbon cord comprises a fiber ribbon including a plurality of optical fibers, the fiber ribbon having a cross-section which is flat in the first direction, a plurality of the first tendency providers juxtaposed along about the optical fiber ribbon, a sheath covering the exteriors of the fiber ribbon and the first tendency providers, and at least one second tendency provider inserted in the sheath, wherein the second tendency provider provides rigidity at least in the direction crossing the first direction.

According to a second technical aspect of the present invention, the second tendency provider is disposed by the side of an end portion in the first direction of the fiber ribbon.

According to a third technical aspect of the present invention, in the first technical aspect, the second tendency provider is a cushion member and disposed by the side of an end portion in the first direction of the fiber ribbon.

According to a fourth technical aspect of the present invention, in the first technical aspect, the first tendency providers adhere firmly to the interior of the sheath at least by the side of an end portion in the first direction of the fiber ribbon.

According to a fifth technical aspect of the present invention, in the first technical aspect, the optical fiber ribbon cord further comprises reinforcement tapes which are stuck together in order to surround the fiber ribbon.

According to a sixth technical aspect of the present invention, a method of manufacturing optical fiber ribbon cords comprises steps of introducing a optical fiber cord, including both a fiber ribbon with a cross-section flat in the first direction having a plurality of optical fibers and a plurality of first tendency providers juxtaposed along about the optical fiber ribbon, into an extruder; introducing at least one second tendency provider into the extruder so as to be juxtaposed along the optical fiber ribbon cord in the direction crossing the first direction; and extruding sheathing resin through the extruder, and coating the optical fiber ribbon cord and the first tendency providers with the sheathing resin.

According to a seventh technical aspect of the present invention, in the step of introducing the second tendency provider in the sixth technical aspect into the extruder, the second tendency provider is introduced into the extruder so as to be juxtaposed by the side of an end portion in the first direction of the fiber ribbon.

According to a eighth technical aspect of the present invention, a method of manufacturing optical fiber ribbon cords comprises a step of juxtaposing a plurality of first tendency providers along about a fiber ribbon which has a cross-section flat in the first direction and a plurality of optical fibers, and introducing them into an extruder; a step of juxtaposing at least one cushion member along the fiber ribbon and the first tendency providers to introduce them into the extruder; and a step of extruding sheathing resin through the extruder to thermally fusion-bond the fiber ribbon, the first tendency providers and the cushion member.

According to a ninth technical aspect of the present invention, a method of manufacturing optical fiber ribbon cords comprises a step of juxtaposing a plurality of first tendency providers along about an optical fiber ribbon which has a cross-section flat in the first direction and a plurality of optical fibers, the first tendency providers being disposed at least by the side of an end portion in the first direction of the fiber ribbon; s step of applying adhesive to portions, which will contact to the interior of a sheath, of the first tendency providers disposed by the side of the end portion in the first direction of the fiber ribbon; and a step of extrusion-coating the exteriors of the fiber ribbon and a plurality of the first tendency providers with sheathing resin.

According to a tenth technical aspect of the present invention, a method of manufacturing optical fiber ribbon cords comprises a step of sticking reinforcement tapes together in order to surround a fiber ribbon which has a cross-section flat in the first direction and a plurality of optical fibers; a step of juxtaposing a plurality of first tendency providers along about the fiber ribbon; and a step of extrusion-coating the exteriors of the fiber ribbon, the reinforcement tape and a plurality of the first tendency providers with sheathing resin.

BRIEF DESCRIPTION OF THE DRAWINGS

FIG. 6A is an illustrative diagram showing a second method of manufacturing an optical fiber ribbon cord of the present invention; FIG. 6B is a partially enlarged cross-sectional view of the optical fiber ribbon cord extruded from a preceding extruder; FIG. 6C is a partially enlarged cross-sectional view of the optical fiber ribbon cord extruded from a following extruder.

FIG. 8 shows the measured results about force applied to the optical fiber cord pertaining to the first and second embodiments and a conventional one in the direction of the major axis and those about attenuation.

FIG. 10 shows the measured results about force applied to the optical fiber cord pertaining to the second and third embodiments and the conventional one in the direction of the major axis and those about attenuation.

FIG. 11A shows an example with a cushion disposed in the direction of the major axis and FIG. 11B shows that with a cushion disposed all over the internal circumference of a sheath.

FIG. 19 shows the measured results about force applied to the optical fiber cord pertaining to the seventh and eighth embodiments and the conventional one in the direction of the major axis, and also shows those about attenuation.

FIG. 20 is a cross-sectional view of an optical fiber cord pertaining to a ninth embodiment of the present invention.

FIG. 22 shows the measured results about attenuation in an optical fiber cord with inserted tape bodies according to the ninth and tenth embodiments, and in the conventional one.

DESCRIPTION OF THE PREFERRED EMBODIMENT

First Embodiment

Figure 1A:
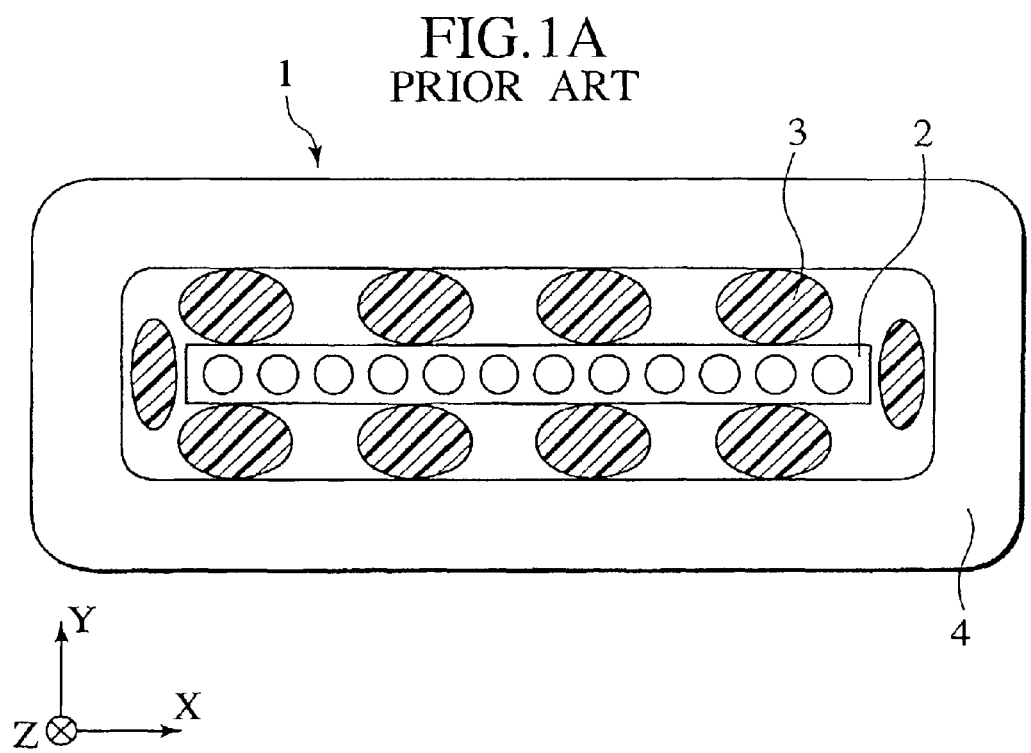
FIG. 1A and FIG. 1B are the cross-sectional views of the conventional optical fiber ribbon cord at rest just as manufactured and of the optical fiber ribbon cord in operation, respectively.
Figure 1B:
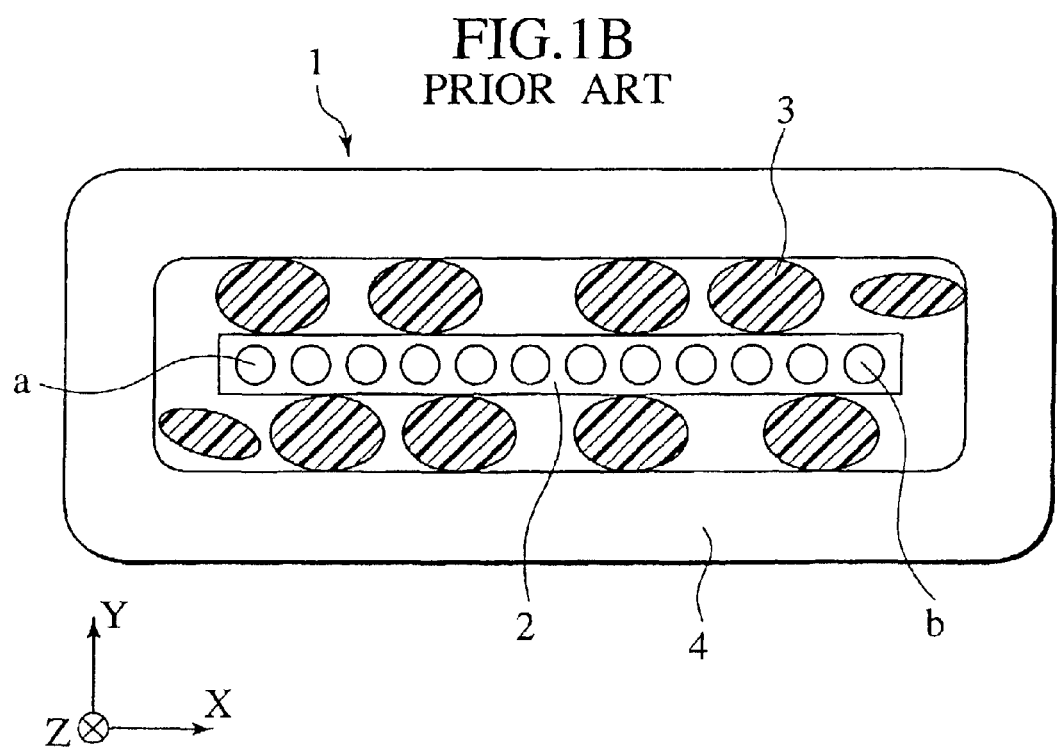
Figure 2:
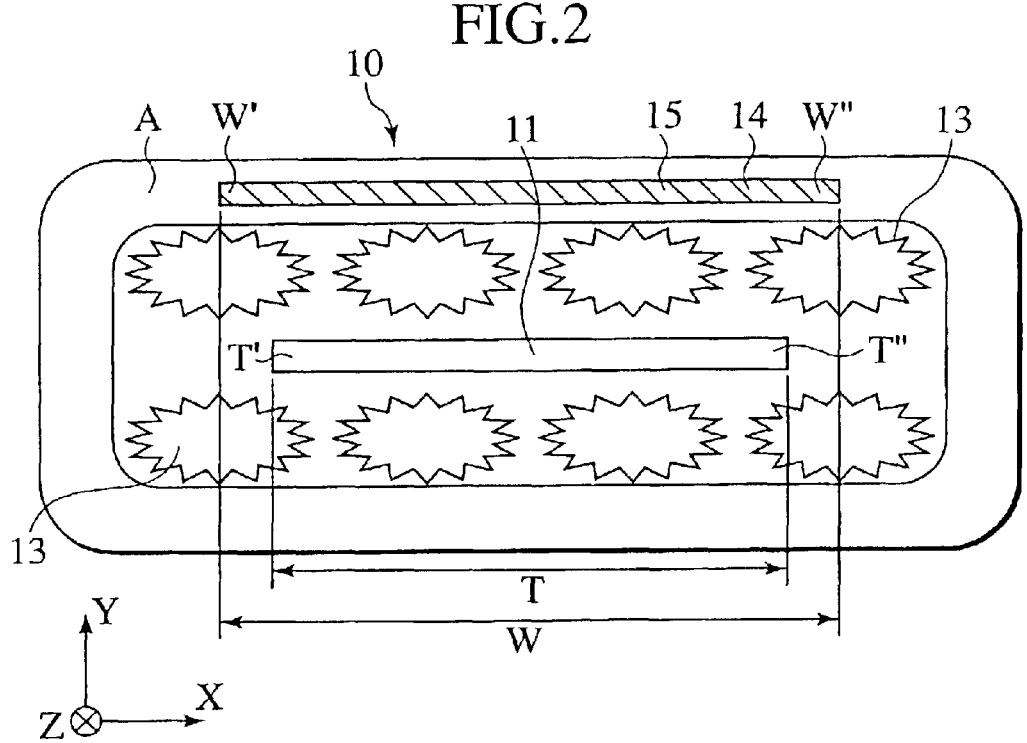
FIG. 2 is a cross-sectional view of an optical fiber cord on the basis of a first embodiment of the present invention.

The structure of an optical fiber cord of the present invention will be described on the basis of FIG. 2 to FIG. 4. FIG. 2 is a cross-sectional view of an optical fiber ribbon cord on the basis of a first embodiment of the present invention. In FIG. 2, an optical fiber ribbon cord is depicted as 10, in the center of which a multi-core fiber ribbon (hereafter referred to "fiber ribbon") 11 having 12 fibers therein is disposed. A cross-section of the fiber ribbon 11 has an asymmetrical shape flat in the X-direction (first direction). Tension fibers 13 as a first tendency provider surround the exterior of the fiber ribbon 11 on both sides of the fiber ribbon 11 in order to provide rigidity such as tensile strength in the Y-direction (second direction) crossing X-direction of the fiber ribbon 11, and further the exterior of them are covered with a sheath 14.

In the Y-direction of the fiber ribbon, that is to say, in the direction of the minor axis (Y-direction) of the sheath 14, inserted is a tape body 15 as a second tendency provider in at least one side wall A. Young's modulus of the tape body 15 is selected to be higher than that of the sheath 14, the tape body 15 having a flat cross-section, and preferably a larger thickness for enhancing the rigidity. In the present invention, the second tendency provider provides rigidity for its surroundings and itself performs elastic or buffer action. When the tape body 15 is disposed within the sheath, it can provide rigidity in its vicinity in the direction of the plane of the tape body 15. In the present embodiment, the tape body 15 provides rigidity mainly in the Y-direction and reinforces the Y-directional rigidity of the fiber ribbon 11. As the material for the tape body 15 employed is a metal worked into the shape of a tape or a plastic formed into the shape of a tape. Even paper or unwoven cloth can be used if only rigidity can be obtained.

By inserting the tape body 15 like this into the sheath 14, bending of the fiber ribbon 11 can be reduced when external force is applied directly to the cord 10 in the direction of the major axis X, and the direct application of stress to the fiber ribbon can be avoided. Further, since the sheath has also turned difficult to shrink by means of the tape body, increase in attenuation due to bending of the fiber ribbon owing to shrinkage of the sheath at a low temperature can be avoided, even though such a force as to make the sheath shrink longitudinally may be applied thereon at the low temperature.

Further, length W in the direction of width of the tape body 15 is wider than length T in the direction of width of the fiber ribbon 11, moreover both end portions W', W" of the tape body 15 in the width direction are inserted in such a state that they extend farther than both end portions T', T" of the fiber ribbon 11. Thereby, when external force is applied in the direction of major axis X, the fiber ribbon 11 is more resistant to bending and the rigidity can be obtained.

First Changed Embodiment

Figure 3:
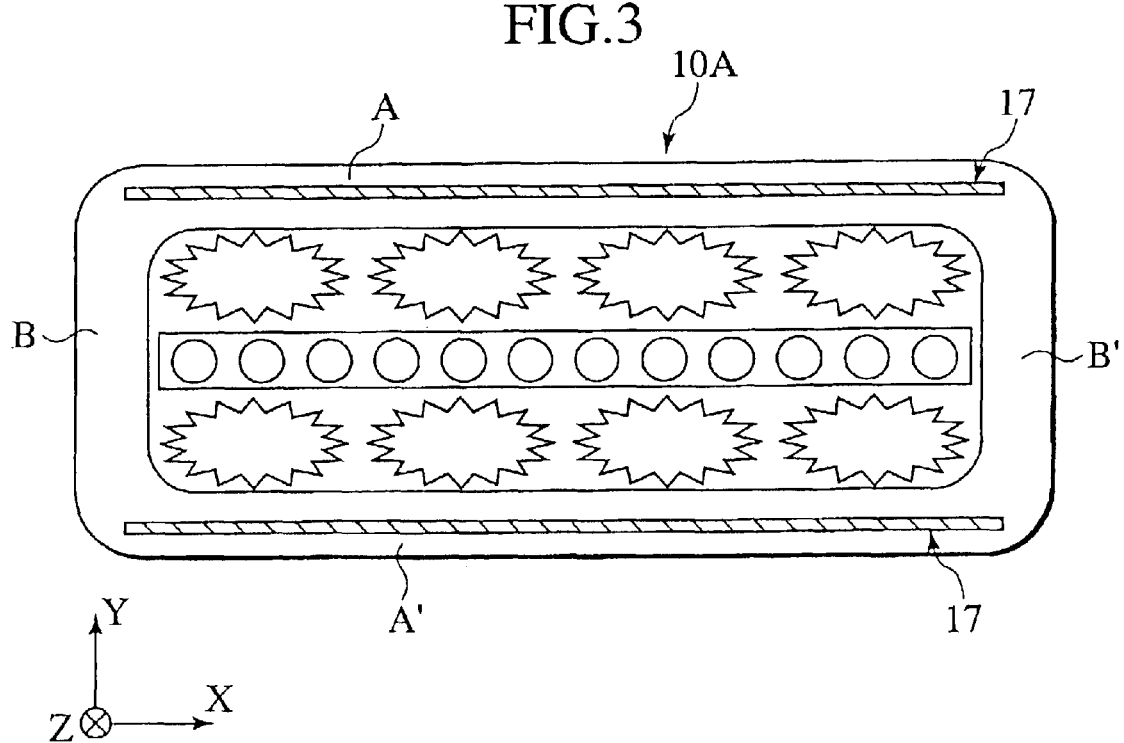
FIG. 3 is a cross-sectional view of an optical fiber cord on the basis of a first changed embodiment of the first embodiment of the present invention.

FIG. 3 shows first changed embodiment of the first embodiment, and both end portions of a tape body 17 in its width direction (X-direction) extend even to side walls B, B' of the sheath 18 in the direction of the major axis. And, since the tape bodies 17 are inserted in both side walls A, A' of the sheath 18 in the direction of the minor axis (Y-direction), an optical fiber cord having higher bending rigidity compared with that of the first embodiment can be obtained.

Second Changed Embodiment

Figure 4:
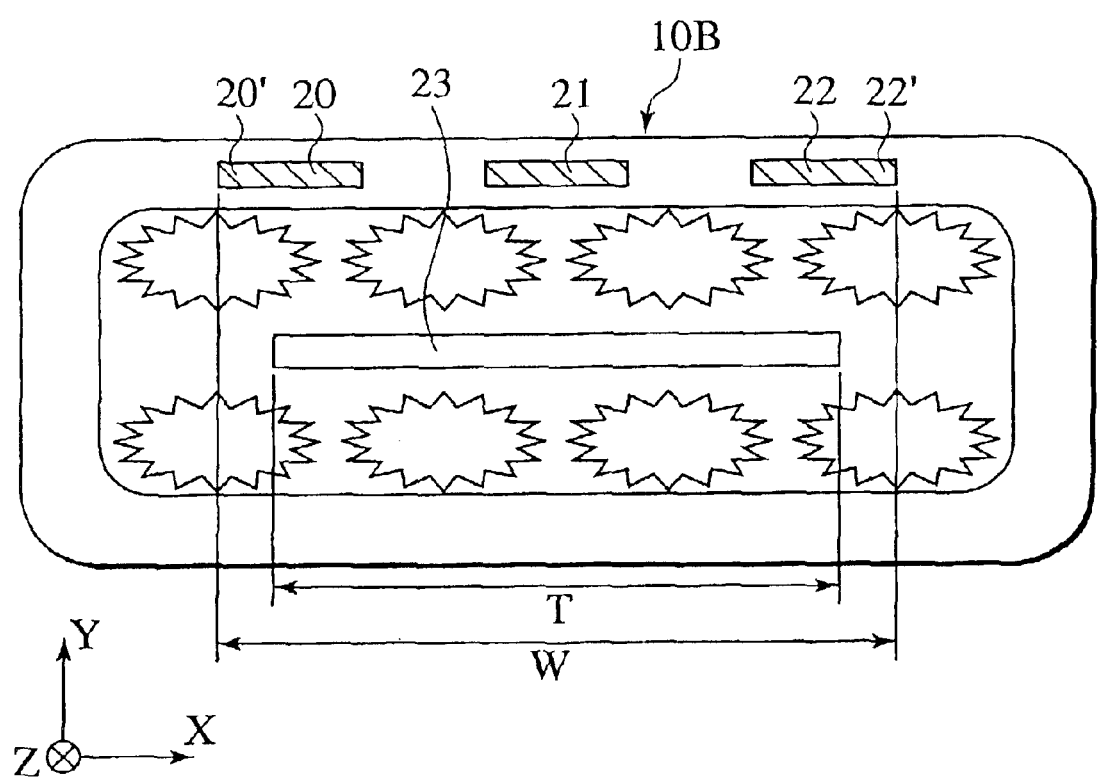
FIG. 4 is a cross-sectional view of an optical fiber ribbon cord on the basis of a second changed embodiment of the first embodiment of the present invention.

FIG. 4 shows second changed embodiment of the first embodiment, and a plurality of tape bodies with small width, for example 3 pieces, 20, 21, 22 are inserted. Even in the tape members small in width like this, if only the distance W between end portions 20' and 22' of the tape bodies 20, 22 is made larger than the width T of a fiber ribbon 23, bending rigidity against external force in the direction of the major axis of a sheath.

As mentioned above, although there can be thought of various changes in length of the tape bodies in the direction of width, the number of inserted tape bodies, or the location of disposition, variables may be appropriately selected from suitable ones on the basis of kind of the fiber ribbons, rigidity of sheath material, or sort of manufacturing methods, etc.

According to the first Embodiment of the present invention, since the rigidity against bending is enhanced by the tape body with higher Young's modulus than that of the sheath, the force cannot be applied directly to the fiber ribbon even if external force is applied to the sheath especially in the direction of the major axis. Moreover, even if force making the sheath shrink longitudinally is applied at low temperature, increase in attenuation can be prevented because of uneasiness of bending by means of the tape body. Further, when external force is applied to the sheath in the direction of the major axis, rigidity can be obtained due to uneasiness of bending of the fiber ribbon.

Second Embodiment

Figure 5:
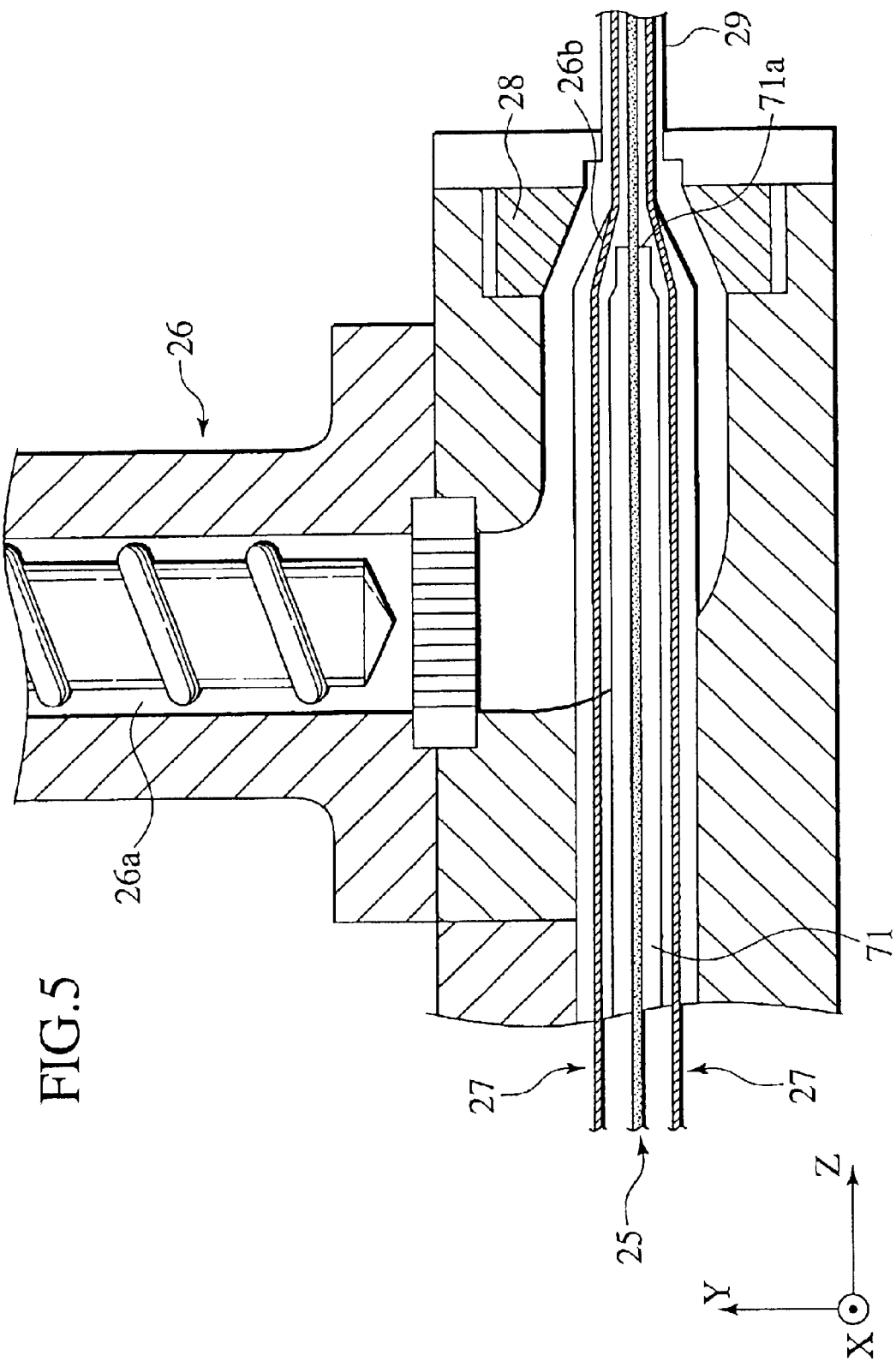
FIG. 5 is an illustrative diagram showing a first method of manufacturing an optical fiber ribbon cord of the present invention.

A method of manufacturing an optical fiber cord pertaining to the first Embodiment of the present invention will be described on the basis of FIG. 5–FIG. 7. FIG. 5 is an illustrative diagram showing a method of manufacturing an optical fiber ribbon cord of the present invention.

In FIG. 5, the optical fiber ribbon cord 25 comprises a plurality of tension fibers as first tendency provider juxtaposed longitudinally along about an optical fiber ribbon. The optical fiber ribbon cord 25, the exterior of which is covered with the sheath composed of a resin, is introduced into the center of an extruder 26. Also introduced are the tape bodies 27, 27 so as to be juxtaposed longitudinally (Z-direction) along about the exterior of the cord 25. Besides, the cross-section of the fiber ribbon has the shape of an asymmetrically flat in the X-direction (first direction).

The extruder 26 includes an inlet 26a, and by passing the two tape bodies 27, 27 as second tendency providers juxtaposed along about a ready-made optical fiber ribbon cord through a die 28, the optical fiber ribbon cord 29 as shown in the first embodiment having the two tape bodies 27, 27 inserted in the internal side walls in the direction of the minor axis (Y-direction) can be obtained.

Thereby, an optical fiber ribbon cord 29, which has high rigidity and is able to protect the optical fiber ribbon against the external force applied in the direction of the major axis of the sheath, can be easily manufactured using the ready-made optical fiber ribbon cord.

First Changed Embodiment

FIG. 6 shows a first changed embodiment of the second embodiment, and FIG. 6A shows a part of manufacturing process where two extruders 30, 31 are disposed in communication with each other. According to the present embodiment, an optical fiber ribbon 32 is introduced in to the center of the extruder 30, and tension fibers 33 as first tendency providers are introduced longitudinally along about its exterior on both sides in the Y-direction. The extruder 30 includes an inlet 30a for introducing a sheathing resin, and an optical fiber ribbon cord 35 is molded by being covered with the sheathing resin while passing through a die 34.

In the cross-section of the optical fiber ribbon cord 35 at the time after having passed though the die 34, as shown in FIG. 6B, there are formed an optical fiber ribbon 32 in the middle, tension fibers 33 outside thereof, a sheathing resin 36 further outside of them all.

The optical fiber ribbon cord 35 is, at the downstream manufacturing line, introduced into the extruder 31, and at the same time tape bodies 37 as second tendency providers are introduced being juxtaposed longitudinally along about the exterior thereof. The extruder 31 includes an inlet 31a for introducing a sheathing resin, and an optical fiber ribbon cord 40 is molded by being covered with the sheathing resin 39 while passing through a die 38.

In the cross-section of the optical fiber ribbon cord 40 after having passed though the die 38, as shown in FIG. 6C, there are formed in a multi-layered form an optical fiber ribbon 32 in the center, tension fibers 33 outside thereof, a sheathing resin 36, a tape body 37, a sheathing resin 39 further outside of them all.

Since the two extruders 30, 31 are installed in the one manufacturing process, an optical fiber ribbon cord 40 in which the optical fiber ribbon 32 is kept undamaged can be manufactured continuously with ease.

Second Changed Embodiment

Figure 7A:
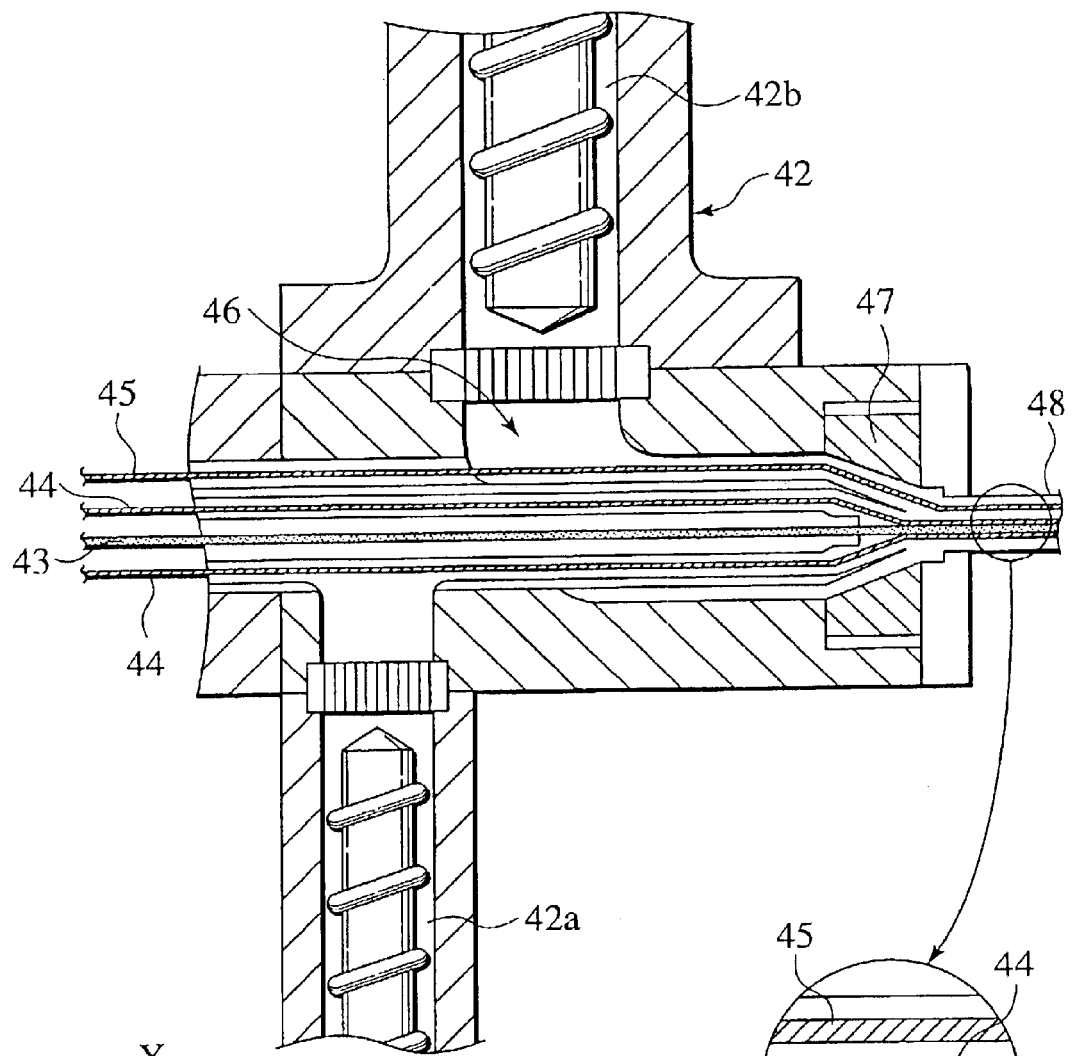
FIG. 7A is an illustrative diagram showing a third method of manufacturing an optical fiber cord of the present invention.

FIG. 7A shows a second changed embodiment of the second embodiment, and an extruder 42 includes 2 inlets, 42a, 42b for introducing sheathing resin. In the middle level of the extruder 42 introduced is an optical fiber ribbon 43, and along about the exterior and on both sides thereof introduced are tension fibers 44 as first tendency providers juxtaposed longitudinally in Y-direction, further about the exterior of them introduced is one tape body 45 as a tendency provider being juxtaposed longitudinally along about them.

The same resin is introduced from the resin inlets 42a, 42b. The resin introduced from the resin inlet 42a prevents the tension fibers 44 from integrating into one body with the tape body 45 by means of forming a resin layer outside of the tension fibers 44 at a die portion 47. Then, by introducing resin 46 from the resin inlet 42b, an optical fiber ribbon cord 48 as shown in FIG. 2 in the first embodiment can be obtained at the die portion 47.

Figure 7B:
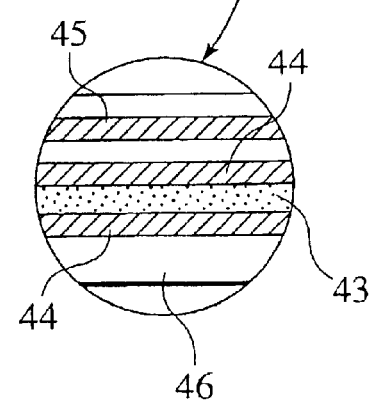
FIG. 7B is a partially enlarged cross-sectional view of the optical fiber cord extruded from an extruder.

In the cross-section of the optical fiber ribbon cord 48 after having passed though the die 47, as shown in FIG. 7B, there are formed in a multi-layered form an optical fiber ribbon 43 in the middle layer, tension fibers 44 on both the outsides thereof, a tape body 45 and a sheathing resin 46 further outside of them all. Thereby, an optical fiber ribbon cord 48, in which the optical fiber ribbon 43 is kept undamaged can be easily manufactured by the only one extruder 42.

FIG. 8 shows the measured results about attenuation of an optical fiber ribbon cord with an inserted tape body of the present invention and of a conventional one without any inserted tape body, when force is applied thereto in the direction of the major axis. In the table, the positions at which measurement has been made are an end of a fiber ribbon and the center of the fiber ribbon, and the force applied in the direction of the major axis were two kinds of force, 250N and 500N via an iron plate with width of 100 mm. Besides, wavelength of a light source for attenuation measurement was 1.55 μm.

Conditions used in the measurement according to the present invention were as follows:
  a fiber ribbon in the type of SM (single mode) with 12 fibers; tension fibers composed of 8 polyaramide fibers with 1420 deniers; tape bodies made of polypropylene with thickness of 30 μm, 4.2 mm in width, Young's modulus of 2000N/mm$^2$, each one being inserted in both the side walls in the direction of the minor axis of a sheath.

As sheathing material used was a nonflammable polyolefin resin with a size of 2.5 mm×5 mm on the outside, 1.5 mm×4 mm on the inside, and Young's modulus of 200N/mm$^2$.

As seen in FIG. 8, the increase by 0.2 dB in attenuation occurred at the end of the fiber ribbon, when 500N was applied to the conventional optical fiber ribbon cord. However, in the optical fiber ribbon cord according to the present invention generated no attenuation at the end of the fiber ribbon even on the same conditions.

According to the present embodiment, an optical fiber cord, which has high bending rigidity, and where the optical fiber ribbon are protected against the external force applied in the direction of the major axis to a sheath, can be easily obtained using a ready-made conventional optical fiber ribbon cord. Further, since the two extruders are installed in the one manufacturing process, an optical fiber ribbon cord in which the optical fiber ribbon is kept undamaged can be manufactured continuously with ease. Still further, an optical fiber ribbon cord in which the optical fiber ribbon is kept undamaged can be manufactured continuously with ease by means of only one extruder.

Third Embodiment

Figure 9:
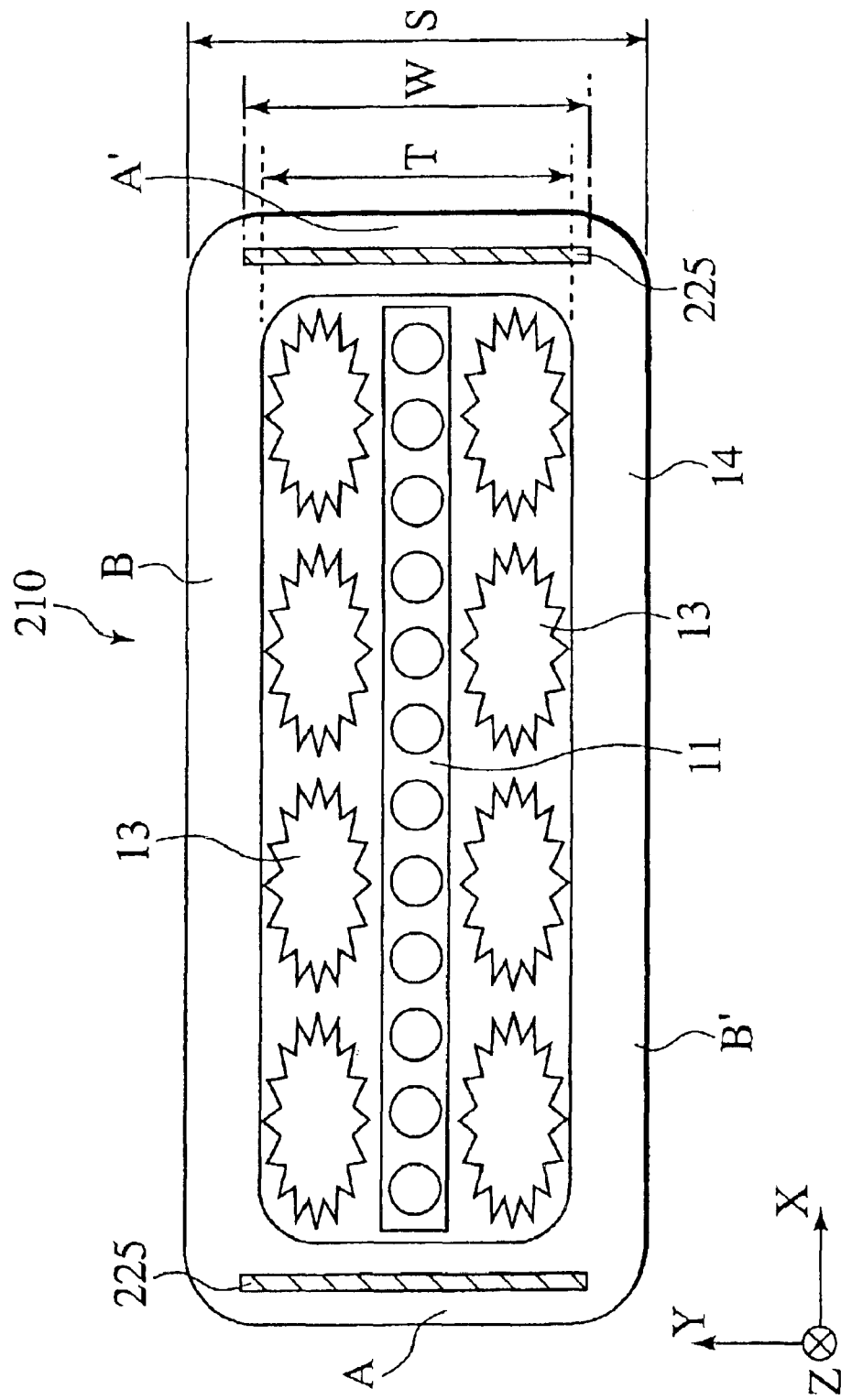
FIG. 9 is a cross-sectional view of an optical fiber cord pertaining to a third embodiment of the present invention.

A structure of an optical fiber ribbon cord will be described on the basis of FIG. 9.

Since, the optical fiber ribbon cord 210 pertaining to the present embodiment has the same structure as that of the first embodiment except for a tape body 225, the explanation of common features is omitted.

Each of tape bodies 225, 225 is inserted in each of two opposing side walls A, A' respectively in the direction of the major axis X of a sheath 14. Young's modulus of the tape body 225 is selected to be higher than that of the sheath 14, the tape body 225 having preferably a larger thickness for enhancing the rigidity. And as the material of the tape body 225 employed is a metal worked into the shape of a tape or a plastic formed into the shape of a tape. Even paper or unwoven cloth can be used if at least rigidity can be obtained.

By inserting the tape body 225 like this into the sheath 14, bending of the fiber ribbon 11 can be reduced when external force in the direction of the major axis is applied directly to the cord 210, and the direct application of the force to the fiber ribbon can be avoided. Since the sheath does not shrink by means of the tape body and the fiber ribbon has turned difficult to bend, increase in attenuation at a low temperature can be avoided, even though such a force as to make the sheath shrink longitudinally may be applied thereon at the low temperature.

Further, the length W in the width direction of the tape body 225 is longer than the internal distance T between the side walls B, B' in the direction of the minor axis Y of the sheath and shorter than the thickness S of the cord. Thereby, when external force is applied in the direction of major axis, the fiber ribbon 11 is more resistant to bending and the rigidity can be obtained.

Namely, according to the present embodiment, since the rigidity against bending is enhanced by the tape body with higher Young's modulus than that of the sheath, the force cannot be applied directly to the fiber ribbon even if external force is applied to the sheath especially in the direction of the major axis. Even if force making the sheath shrink longitudinally is applied at low temperature, increase in attenuation can be prevented because of uneasiness of bending by means of the tape body.

Moreover, an optical fiber ribbon cord, which has high bending rigidity, and where the optical fiber ribbon are protected against the external force applied in the direction of the major axis to a sheath, can be easily obtained using an optical fiber ribbon cord manufactured by prior art.

Fourth Embodiment

Since a method of manufacturing an optical fiber ribbon cord pertaining to the third Embodiment of the present invention is the same as those in the second Embodiment shown in FIG. 5-FIG. 7, the explanation about the common features will be omitted.

According to the manufacturing method shown in FIG. 5, an optical fiber ribbon cord, which has high bending rigidity, and where the optical fiber ribbon are protected against the external force applied in the direction of the major axis X to a sheath, can be easily obtained using a ready-made optical fiber ribbon cord.

According to the manufacturing method shown in FIG. 6, since the two extruders 30, 31 are installed in the one manufacturing lines, an optical fiber ribbon cord 40 in which the optical fiber ribbon 32 is kept undamaged can be manufactured continuously with ease.

According to the manufacturing method shown in FIG. 7, an optical fiber ribbon cord 48 in which the optical fiber ribbon 43 is kept undamaged can be manufactured continuously with ease using only one extruder 42.

FIG. 10 shows the measured results about attenuation of an optical fiber ribbon cord with an inserted tape body of the present invention and of a conventional one without any inserted tape body, when force is applied thereto in the direction of the major axis X. In the figure, the positions at which measurement has been made are an end of a fiber ribbon and the center of the fiber ribbon, and the force applied in the direction of the major axis were two kinds of force, 250N and 500N via an iron plate with width of 100 mm. Besides, wavelength of a light source for attenuation measurement was chosen to be 1.55 μm.

The various dimensions of the optical fiber ribbon cord, which was used in the measurement, according to the present invention were: a fiber ribbon in the type of SM (single mode) with 12 fibers; tension fibers composed of 8 polyaramide fibers with 1420 deniers; tape bodies made of polypropylene with thickness of 30 μm, 11.0 mm and 2.0 mm in width, Young's modulus of 2000N/mm², each one being inserted in both the side walls in the direction of the minor axis of a sheath. Moreover, as sheathing material used was a nonflammable polyolefin resin with a size of 2.5 mm×5 mm on the outside, 1.5 mm×4 mm on the inside, and Young's modulus of 200N/mm².

As seen in FIG. 10, the increase by 0.2 dB in attenuation occurred at the end of the fiber ribbon as a force of 500 N was applied to the conventional optical fiber ribbon cord. However, in the optical fiber ribbon cords according to the present invention generated no attenuation as for the one with an inserted tape with 2.0 mm in width. Further, even as for the one with an inserted tape with 1.0 mm in width narrower than the width (1.5 mm) on the inside of the cord in the direction of the minor axis, attenuation remains as low as 0.05 dB in said experiment (measurement about attenuation), and it was recognized that increase in attenuation due to external force far hardly occurs than in conventional optical fiber ribbon cords.

According to the present embodiment, since the two extruders are installed in the one manufacturing lines, an optical fiber ribbon cord in which the optical fiber ribbon is kept undamaged can be manufactured continuously with ease.

And, an optical fiber ribbon cord in which the optical fiber ribbon is kept undamaged can be manufactured continuously with ease using only one extruder.

Fifth Embodiment

Figure 11A:
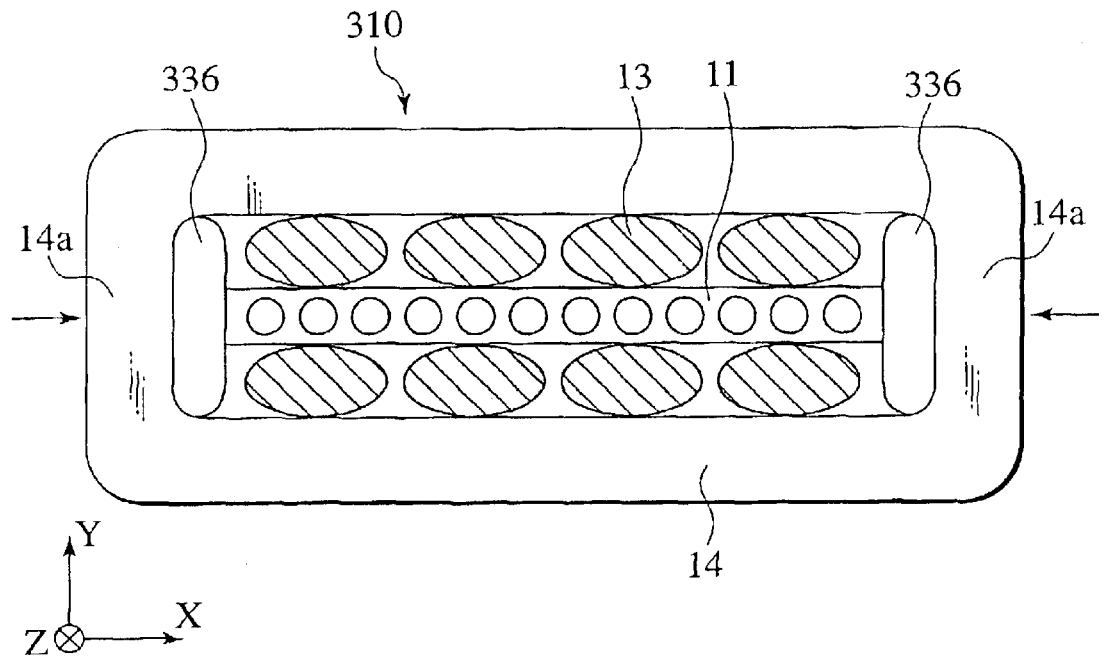
FIGS. 11A and 11B are each cross-sectional view of an optical fiber cord pertaining to a fifth embodiment of the present invention.

A fifth embodiment of the present invention will be described. An optical fiber ribbon cord pertaining to the present embodiment has across-sectional structure as shown in FIG. 11A. In the figure, an optical fiber ribbon cord is depicted by numeral 310; in the center a multi-core fiber ribbon 11 having 12 fibers therein being disposed; tension fibers 13 for providing tensile strength in the direction of the minor axis surrounding the exterior of the fiber ribbon 11; cushion members 336, 336 being disposed at both ends in the direction of the major axis (X-direction) of the fiber ribbon 11 also surrounding the fiber ribbon 11; and the exterior of them are covered with a sheath 14.

The cushion members 336, 336 are fixed immovably to both ends 14a, 14a in the direction of the major axis X of the sheath 14. Thus, even if external force is applied in the direction of the major axis (X-direction shown by arrows) to the sheath 14, the ends of the fiber ribbon 11 would always be protected by the cushion members 336, 336.

Figure 11B:
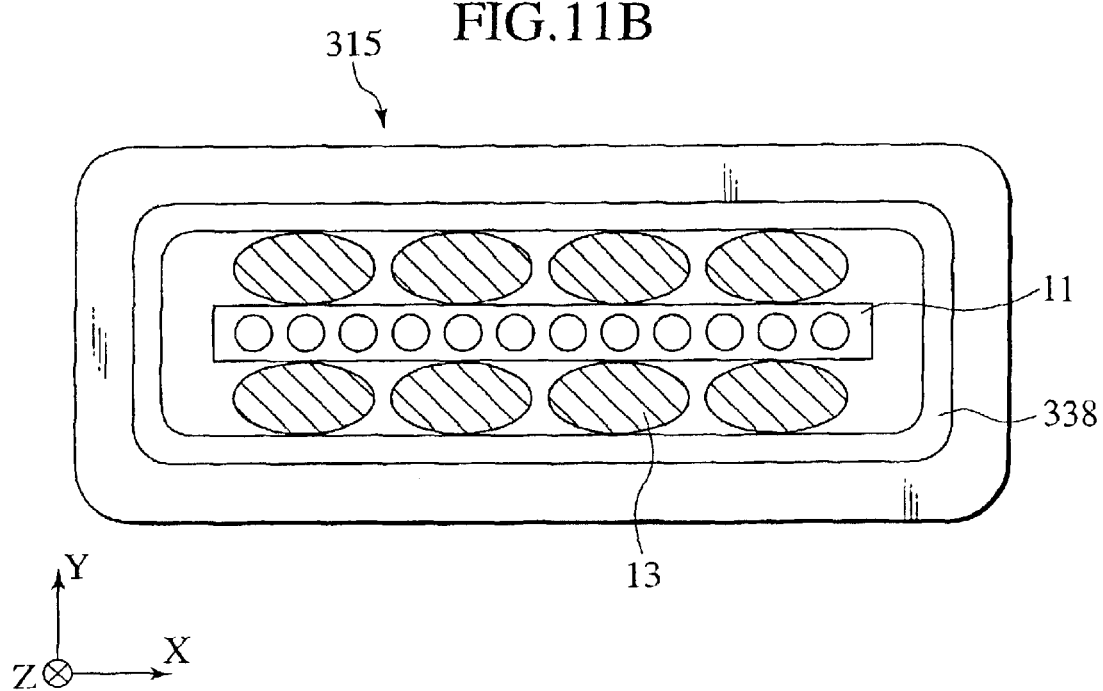

FIG. 11B is a changed example of an optical fiber ribbon cord, and the optical fiber ribbon cord 315 is the same in structure as the optical fiber ribbon cord 310 in the fact that in the center disposed is a multimode fiber ribbon 11 having 12 fibers therein, and on both sides of the fiber ribbon also disposed ate tension fibers 13 in the direction of the minor axis Y upside and downside of the fiber ribbon, however, different in the fact that a cushion member 338 surrounds entirely the exterior of both the fiber ribbon 11 and the tension fibers 13. Thereby, since the cushion member is effective against external force from all directions, the fiber ribbon can surely be protected against it.

The cushion members 336 (338) have preferably lower hardness than that of the sheath 14, and soft foamed plastic such as polyurethane, polyethylene, polyvinyl chloride are suitably used, but formations of cotton or fibers can also be usable. Besides, PVC, polyolefin resin, and polyamide resin are preferably used as the sheath material.

According to the present embodiment, since the cushion members are fixed immovably to the longitudinal side walls in the interior of the sheath, the fiber ribbon can always be protected by the cushion members when external force is applied in the direction of the major axis Y of the sheath.

Sixth Embodiment

A method of manufacturing an optical fiber ribbon cord of the fifth Embodiment of the present invention will be described on the basis of the process diagram shown in FIG. 12. A fiber ribbon 40 has been accomplished being juxtaposed longitudinally (Z-direction) with tension fibers as first tendency providers in the step A, and the fiber ribbon 40a having the tension fibers is introduced into an extruder B. The extruder B includes a body 44 having an inlet 42a for introducing sheathing resin 42 and an inlet 43a for introducing cushion resin 43, and simultaneously extruded are cushion resin 43 around the exterior of the fiber ribbon 40a and sheathing resin 42 around the further exterior of them, and both are then thermally fusion-bonded to yield an optical fiber ribbon cord 40b. Since the cushion member and the sheath are thermally fusion-bonded, there will be no chance for both to dislocate with each other after production.

Figure 12:
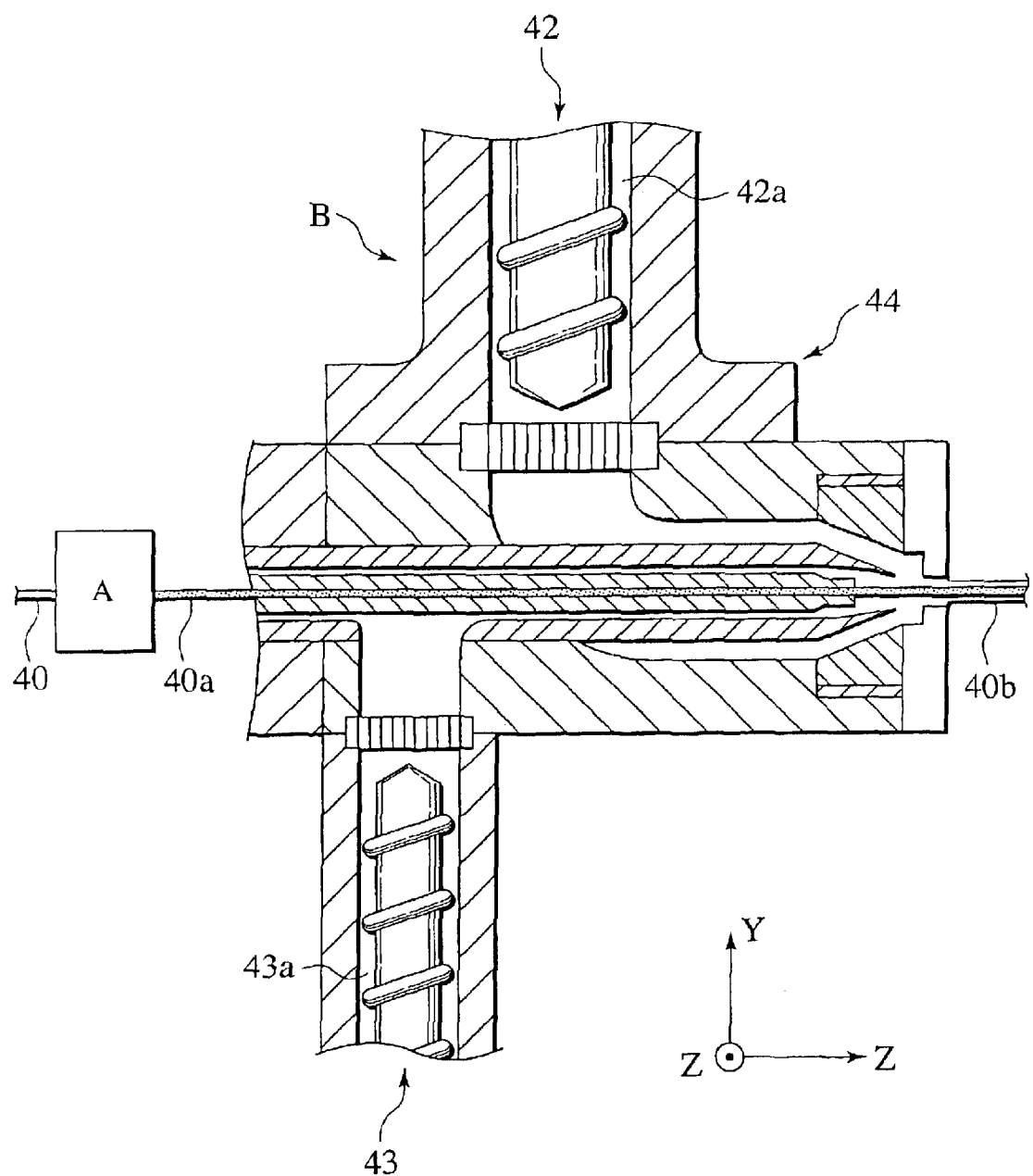
FIG. 12 is a process diagram showing a first manufacturing method of an optical fiber cord pertaining to a sixth embodiment of the present invention.

The simultaneous thermal fusion bonding shown in FIG. 12 is a method for manufacturing the optical fiber ribbon cord in which cushion resin 43 surrounds entirely the exterior of the fiber ribbon 40a, on the other hand when the optical fiber ribbon cord in FIG. 11B is manufactured, such a die shaped as to extrude the cushion resin 43 only at both ends in the direction of the major axis of the fiber ribbon 40a.

Since the cushion member and the sheath can be extruded at the same time to be fusion-bonded with each other, manufacturing processes are never complicated.

Figure 13:
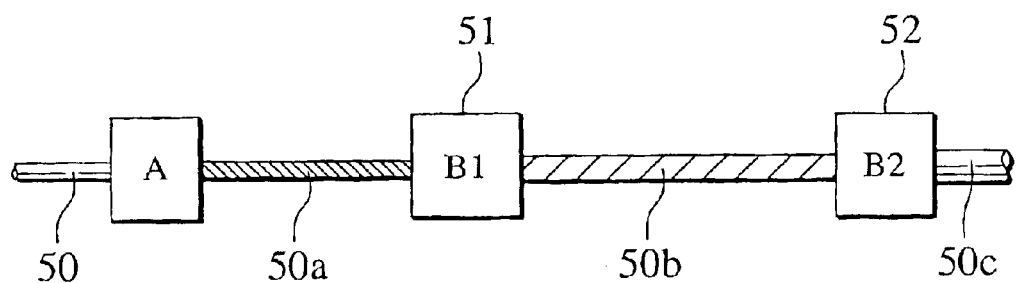
FIG. 13 is a schematic process diagram showing a second manufacturing method of an optical fiber cord pertaining to the sixth embodiment of the present invention.

A second method of manufacturing an optical fiber ribbon cord of the fifth Embodiment of the present invention will be described on the basis of the schematic process diagram shown in FIG. 13. A fiber ribbon 50 has been accomplished being juxtaposed longitudinally with tension fibers as first tendency providers in the step A, and the fiber ribbon 50a having the tension fibers is introduced into an extruder B1. The extruder B1 is a preceding extruder in the production lines, through which the cushion resin 51 is extruded.

A fiber ribbon 50b where the cushion member is fixed to the required position is then introduced into a following extruder B2. An optical fiber ribbon cord 50c is manufactured by means of extruding the sheathing resin 52 through the following extruder B2. Since the cushion member and the sheath are thermally fusion-bonded, there will be no chance for both to dislocate with each other after production. Moreover, since observation of molded states such as dislocation of the molded cushion members is possible before extruding the sheathing resin through the extruder, the cushion members can be placed in the accurate position.

According to the present embodiment, manufacturing can be done while observing the molded states such as the dislocation of the molded cushion members before extruding the sheathing resin through the extruder.

Figure 14:
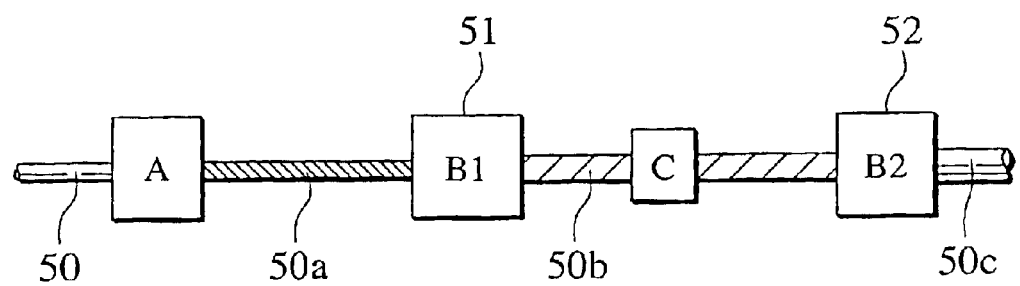
FIG. 14 is a schematic process diagram showing a third manufacturing method of an optical fiber cord pertaining to the sixth embodiment of the present invention.

A third method of manufacturing an optical fiber ribbon cord of the fifth Embodiment of the present invention will be described on the basis of the schematic process diagram shown in FIG. 14. That is to say, even though a cushion member difficult for thermal fusion-bonding to a sheath is employed, adding a step C, where adhesive is applied on the portion of the cushion member having been extruded by the preceding extruder B1 to be contacted to the inner surface of the sheath, after extruding cushion resin 51 through the preceding extruder B1, and before extruding sheathing resin 52 through the following extruder B2 as shown in FIG. 14, will be able to make the cushion members fixed to the prescribed positions of the sheath.

Therefore, according to the present embodiment, even though a cushion member difficult for thermal fusion bonding to a sheath is employed, the cushion members can be fixed using adhesive to the prescribed positions of the sheath.

Figure 15:
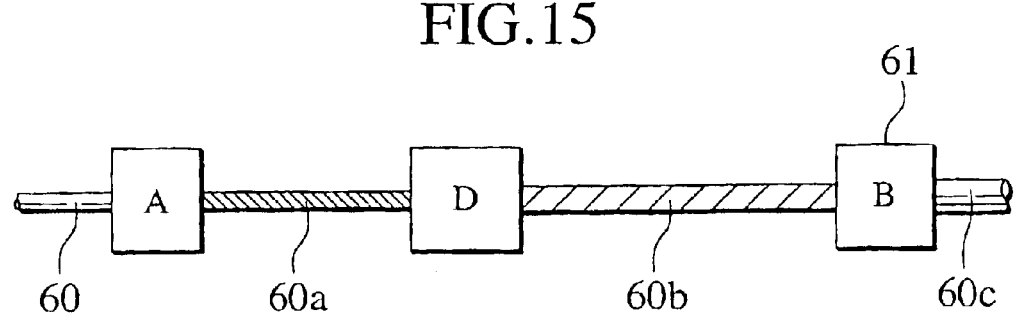
FIG. 15 is a schematic process diagram showing a fourth manufacturing method of an optical fiber cord pertaining to the sixth embodiment of the present invention.

A fourth method of manufacturing an optical fiber ribbon cord of the fifth embodiment of the present invention will be described on the basis of the schematic process diagram shown in FIG. 15. A fiber ribbon 60 has been accomplished being juxtaposed longitudinally with tension fibers in the step A, and the fiber ribbon 60a having the tension fibers is then accomplished being juxtaposed longitudinally with fiber-like cushion members so as to be disposed at least in the major axis of the fiber ribbon in the interior of the sheath in the step D, and a fiber ribbon 60b surrounded with the tension fibers and the cushion members can be obtained.

By extruding sheathing resin 61 is extruded through an extruder B, the cushion members are thermally fusion-bonded with the sheath to yield an optical fiber ribbon cord 60c. When the cushion member is difficult for thermal fusion bonding with a sheath, it is preferable to use a cushion member on which adhesive is applied beforehand in the step D or to add a step in the lines for applying adhesive between the step D and the step B.

According to the present embodiment, even if the cushion member is composed of fiber-like material unsuitable to extrusion molding, manufacturing an optical fiber ribbon cord in which external force can be always relieved will be possible. Moreover, even if the cushion member is unsuitable to extrusion molding, and even when the cushion member is difficult for thermal fusion bonding with the sheath, the cushion member will be fixed using adhesive to the predetermined position of the sheath. Further, even if the cushion member is unsuitable to extrusion molding, and even when the cushion member is difficult for thermal fusion bonding with the sheath, the cushion member will be securely fixed to the sheath by means of applying adhesive efficiently in a series of production flow.

As adhesive used in the present invention, preferably used are polyurethane series, vinyl acetate resin series, epoxy series, chloroprene rubber series, etc.

Figures 16, 17:
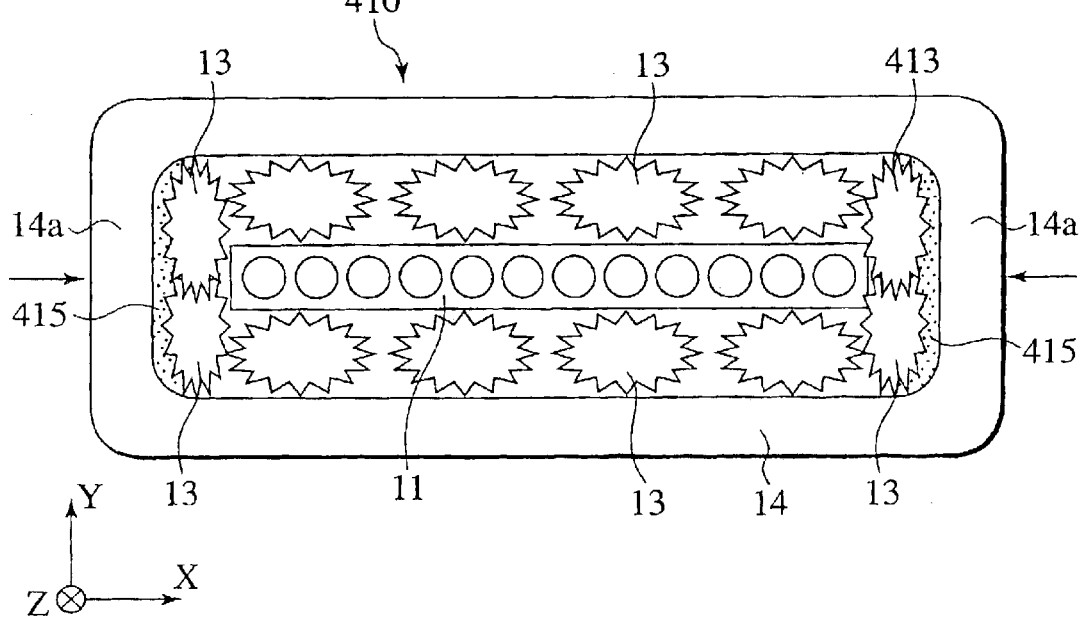
FIG. 16 shows the measured results about force applied to the optical fiber cord pertaining to the fifth and sixth embodiments and the conventional one in the direction of the major axis, and also shows those about attenuation.
FIG. 17 is a cross-sectional view of an optical fiber cord pertaining to a seventh embodiment of the present invention.

FIG. 16 shows the measured results about attenuation of the product according to the present invention and of a conventional one, when force is applied thereto in the direction of the major axis. The positions at which measurement has been made are an end of a fiber ribbon and the center of the fiber ribbon, and the force applied were two kinds of force, 250N and 500N via an iron plate with width of 100 mm. As seen in this FIG. 16, the increase by 0.2 dB in attenuation occurred at the end of the fiber ribbon, when 500N was applied to the conventional optical fiber ribbon cord.

Seventh Embodiment

A seventh embodiment of the present invention will be described on the basis of FIG. 17.

In FIG. 17, 410 is an optical fiber ribbon cord, in the center of which a multi-core fiber ribbon (hereafter referred to "fiber ribbon") 11 having 12 fibers therein is disposed, and tension fibers 13 surround the fiber ribbon 11 on both sides of the fiber ribbon 11 in order to supply tensile strength in the direction of minor axis (Y-direction), and tension fibers 413, 413 surround the fiber ribbon 11 at both ends in the direction of major axis (X-direction) of the fiber ribbon 11, and further the exterior of them are covered with a sheath 14.

The tension fibers 413, 413 disposed at both ends in the direction of the major axis is applied with adhesive 415 on their surfaces to be contacted the inner surface of the sheath so as to be fixed immovably to both ends 14a, 14a in the direction of the major axis of the sheath 14. Thus, the end portions of the fiber ribbon 11 will always be protected by the tension fibers 413, 413 even when external force is applied in the direction of the major axis (in the direction of the arrows) of the sheath 14. It is noted that the external force in the direction of minor axis of the sheath 14 can be supported by the tension fibers 13.

As adhesive 415 used are polyurethane series, vinyl acetate resin series, epoxy series, chloroprene rubber series, etc. and besides, PVC, polyolefin resin, and polyamide resin are preferably used as the sheath material.

Thus, since tension fibers are fixed with adhesive to both longitudinal side walls in the interior of the sheath, the fiber ribbon will always be protected by the tension fibers even when external force is applied in the direction of the major axis of the sheath.

Eighth Embodiment

Figure 18:
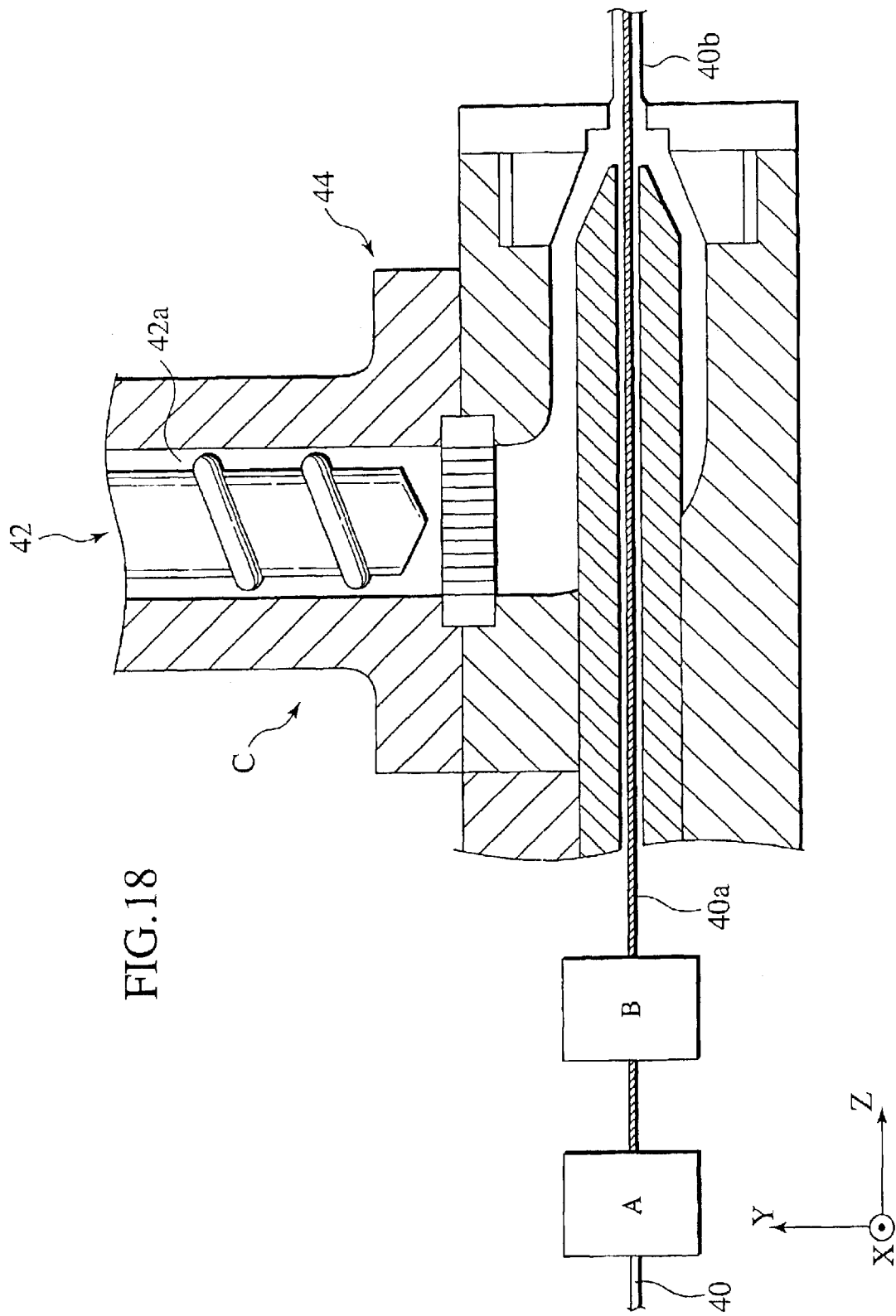
FIG. 18 is a schematic process diagram showing a manufacturing method of an optical fiber cord pertaining to the eighth embodiment of the present invention.

A method of manufacturing an optical fiber ribbon cord pertaining to the seventh Embodiment of the present invention will be described on the basis of the schematic process diagram shown in FIG. 18. A fiber ribbon 40 has been accomplished being juxtaposed longitudinally with tension fibers 13, 413 in the step A. Then, in the step B, the tension fibers 413 are applied with adhesive 415 on their surfaces to be contacted the inner surface of the sheath.

A fiber ribbon 40a about which tension fibers 13, 413 has been thus juxtaposed longitudinally is introduced into an extruder C. The extruder C includes a body 44 having an inlet 42a for introducing sheathing resin 42, and the sheathing resin 42 is extruded about the exterior of fiber ribbon 40a to yield an optical fiber ribbon cord 40b.

FIG. 19 shows the measured results about attenuation of the product according to the present invention and of a conventional one, when force is applied thereto in the direction of the major axis, and the positions at which measurement has been made are an end of a fiber ribbon and the center of the fiber ribbon, and the force applied were two kinds of force, 250N and 500N via an iron plate with width of 100 mm. As seen in FIG. 19, the increase by 0.2 dB in attenuation occurred at the end of the fiber ribbon, when 500N was applied to the conventional optical fiber ribbon cord.

Besides, the dimensions of a cord manufactured for trial are as follows:

Fiber ribbon; 12 fibers, SM fiber ribbon

Tension fibers; polyaramide fibers (1420 denier), 10 fibers

Sheath; nonflammable polyolefin resin, 2.5 mm×5 mm on the outside

Adhesive; polyurethane series adhesive

According to the present embodiment as described above, an optical fiber ribbon cord where the optical fiber ribbon are protected against the external force applied in the direction of the major axis to a sheath, can be easily obtained.

Ninth Embodiment

A ninth embodiment of the present invention will be described on the basis of FIG. 20.

In FIG. 20, an optical fiber ribbon cord is depicted by numeral 510, in the center of which a multi-core fiber ribbon 11 having 12 fibers therein is disposed, and 2 sheets of reinforcement tape surrounding the fiber ribbon 11 are stuck on each other at both ends in X-direction. Tension fibers 13 surround the exterior of the fiber ribbon 11 on both sides of the fiber ribbon 11 in order to supply tensile strength in the direction of minor axis (Y-direction), and further the exterior of them are covered with a sheath 14.

Since stuck portions 512a of the reinforcement tape 512 become rigid in such a constitution, rigidity against bending is increased, and external force applied in the direction of the major axis (in the direction of arrows) of the sheath 14 does not directly work on the fiber ribbon 11 because of cushioning function of the stuck portions 512a.

It is noted that external force in the direction of minor axis of the sheath 14 can be supported by the tension fibers 13, and buckling is also difficult to occur due to enhancement of the rigidity. After all, the fibers can be protected by means of sticking the reinforcement tape 512 with each other and enhancement of reliability of the optical fiber cord can be achieved by lessening increase in attenuation or wire breaks.

The reinforcement tape 512 has preferably the thickness larger than or equal to 10 μm in order to increase its rigidity, and further a material with a comparatively high melting point is suitable in order to endure the heat during extrusion preferably using polypropylene, polyethylene-terephthalate, polyimide, etc. Further, width of the reinforcement tape may be 1 mm to 2 mm larger than that of the fiber ribbon and width of the stuck portions 512a may preferably be 0.5 mm to 1 mm.

As adhesive for sticking the reinforcement tape together used are polyurethane series, vinyl acetate resin series, epoxy series, chloroprene rubber series, etc. and PVC, polyolefin resin, and polyamide resin are used as the sheath material.

According to the present embodiment, since stuck portions of the reinforcement tape become rigid, rigidity against bending is increased, and external force applied in the direction of the major axis of the sheath does not directly work on the fiber ribbon because of cushioning function of the stuck portions 512a.

Tenth Embodiment

Figure 21:
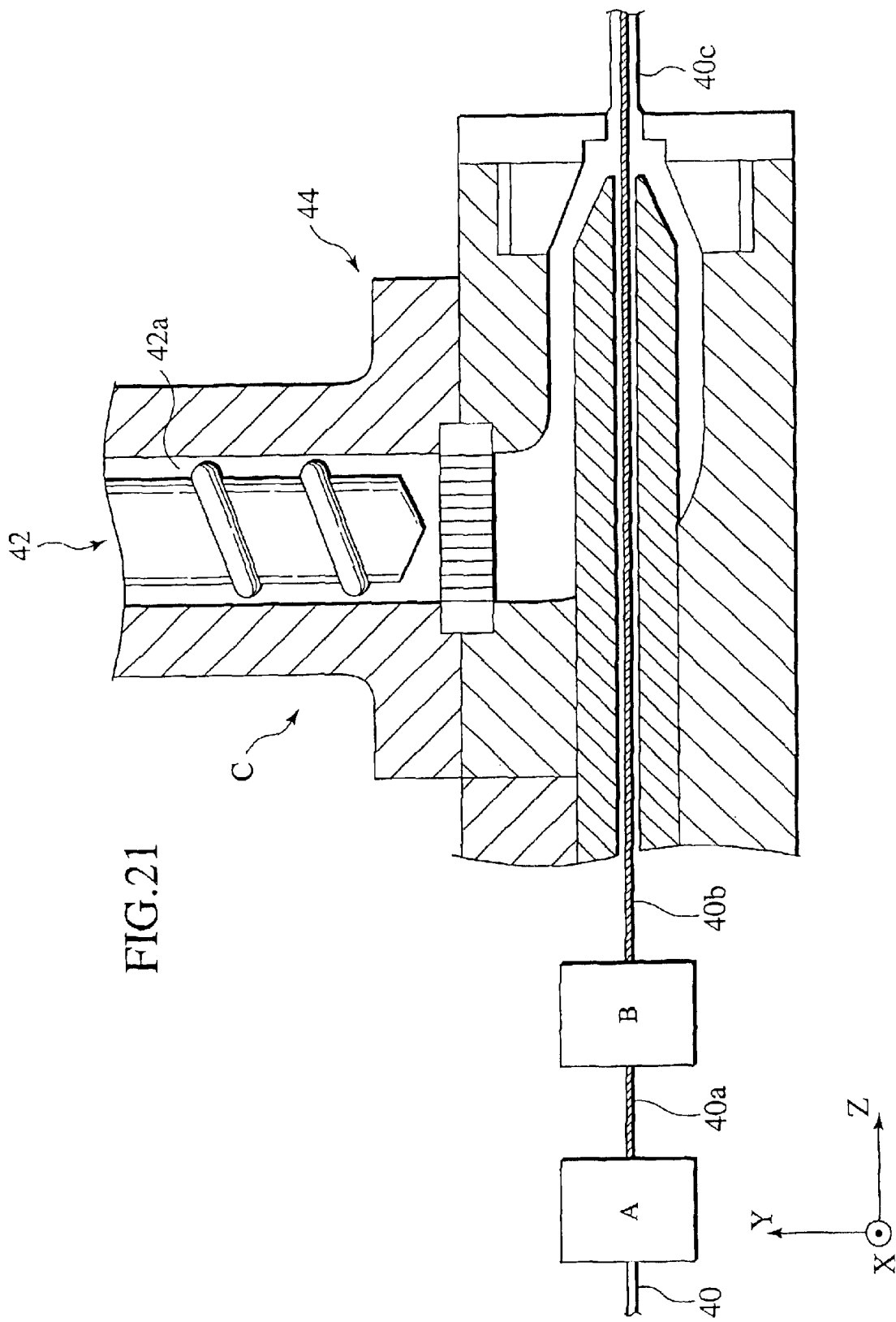
FIG. 21 is a schematic process diagram showing a manufacturing method of an optical fiber cord pertaining to the tenth embodiment of the present invention.

A method of manufacturing an optical fiber ribbon cord pertaining to the ninth Embodiment of the present invention will be described on the basis of the schematic process diagram in FIG. 21. A fiber ribbon 40 is stuck to reinforcement tape 512 with adhesive in the step A to yield a fiber ribbon 40a. Then, a plurality of tension fibers 13 is juxtaposed longitudinally along about it in the step B.

A fiber ribbon 40b along about which tension fibers 13 are juxtaposed longitudinally is introduced into an extruder C. The extruder C includes a body 44 having an inlet 42a for introducing sheathing resin 42, and the sheathing resin 42 is extruded about the exterior of fiber ribbon 40a to yield an optical fiber ribbon cord 40c.

FIG. 22 shows the measured results about attenuation of the product according to the present invention and of a conventional one, when force is applied thereto in the direction of the major axis, and the positions at which measurement has been made are an end of a fiber ribbon and the center of the fiber ribbon, and the force applied were two kinds of force, 250N and 500N via an iron plate with width of 100 mm. As seen in FIG. 22, the increase by 0.2 dB in attenuation occurred at the end of the fiber ribbon, when 500N was applied to the conventional optical fiber ribbon cord.

Besides, the dimensions of a cord manufactured for trial are as follows:

Fiber ribbon; 12 fibers, SM fiber ribbon

Tension fibers; polyaramide fibers (1420 denier), 10 fibers

Sheath; nonflammable polyolefin resin, 2.5 mm×5 mm on the outside

Adhesive; polyurethane series adhesive

According to the present embodiment as described above, an optical fiber ribbon cord, which has high rigidity against bending, and where the optical fiber ribbon are protected against the external force applied in the direction of the major axis to a sheath, can be easily obtained.

This application claims benefit of priority under 35USC §119 to Japanese Patent Applications No. 2002-104463 filed on Apr. 5, 2002, No. 2002-162574 filed on Jun. 4, 2002, No. 2002-162575 filed on Jun. 4, 2002, No. 2002-289194 filed on Oct. 1, 2002, and No. 2002-289195 filed on Oct. 1, 2002, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An optical fiber cord comprising:

a fiber ribbon including a plurality of optical fibers, a cross-section of the fiber ribbon being flat in a first direction;

a plurality of a first tendency providers juxtaposed along about the fiber ribbon;

a sheath covering the exteriors of the fiber ribbon and the first tendency providers; and at least one second tendency provider inserted in the sheath, wherein the second tendency provider provides rigidity at least in the direction crossing the first direction and the a second tendency provider is a tape body with a Young's modulus higher than a Young's modulus of the sheath.

2. The optical fiber ribbon cord of claim 1, wherein the second tendency provider is fixed in a direction crossing the first direction of the fiber ribbon.

3. The optical fiber ribbon cord of claim 2, wherein the second tendency provider extends longer in the first direction than the fiber ribbon.

4. The optical fiber ribbon cord of claim 1, wherein the first tendency provider is a tension fiber.

* * * * *